US007958435B2

(12) United States Patent
Kure et al.

(10) Patent No.: US 7,958,435 B2
(45) Date of Patent: Jun. 7, 2011

(54) PACKET TRANSMISSION APPARATUS, COMMUNICATION SYSTEM AND PROGRAM

(75) Inventors: Yoshinobu Kure, Kanagawa (JP); Masato Kawada, Tokyo (JP)

(73) Assignee: Sony Corporations, Tokyo (JP)

( * ) Notice: Subject to any disclaimer, the term of this patent is extended or adjusted under 35 U.S.C. 154(b) by 1214 days.

(21) Appl. No.: 11/557,834

(22) Filed: Nov. 8, 2006

(65) Prior Publication Data

US 2007/0079222 A1 Apr. 5, 2007

(30) Foreign Application Priority Data

Sep. 11, 2005 (JP) ................................ P2005-324224

(51) Int. Cl.
*H03M 13/00* (2006.01)
(52) U.S. Cl. ..................... 714/776; 714/758; 714/749
(58) Field of Classification Search .................. 714/776, 714/750, 752, 758, 748, 749
See application file for complete search history.

(56) References Cited

U.S. PATENT DOCUMENTS

| 6,421,387 | B1 | 7/2002 | Rhee |
| 6,657,987 | B1 * | 12/2003 | Kumar et al. ................. 370/346 |
| 6,851,084 | B2 * | 2/2005 | Pattavina ...................... 714/776 |
| 7,032,153 | B1 * | 4/2006 | Zhang et al. .................. 714/749 |
| 7,502,818 | B2 | 3/2009 | Kohno et al. |
| 2002/0054578 | A1 | 5/2002 | Zhang et al. |
| 2004/0196786 | A1 * | 10/2004 | Laha et al. ..................... 370/229 |
| 2005/0013249 | A1 * | 1/2005 | Kong et al. ................... 370/235 |
| 2005/0050424 | A1 | 3/2005 | Matsuura |

FOREIGN PATENT DOCUMENTS

| JP | 2000-188609 | 7/2000 |
| JP | 2002-141964 | 5/2002 |
| JP | 2002-374535 | 12/2002 |
| JP | 2003-179580 | 6/2003 |
| JP | 2004-215224 | 7/2004 |
| JP | 2004-254127 | 9/2004 |
| JP | 2005-020499 | 1/2005 |
| JP | 2005-045409 | 2/2005 |
| JP | 2005-064648 | 3/2005 |

OTHER PUBLICATIONS

Japanese Office Action issued on Jun. 9, 2009, for corresponding Japanese Patent Application 2005-324224.
Hiroyuki Nagao, et al., Realization of the quality control mechanism of the hierarchical type streaming by the plural error control techniques, The Information Processing Society of Japan memoir, Japan, Information Processing Society of Japan, Jan. 28, 2004, vol. 2004 No. 8, p. 37-42, 2004-QAI-10.
Jianfeng Pu, et al: "Adaptive Hybrid ARQ in Wireless ATM Networks" Vehicular Technology Conference, 1999. VTC 1999—Fall. IEEE VTS 50th Amsterdam, Netherlands Sep. 19-22, 1999, Piscataway, NJ, USA, IEEE US, vol. 3, Sep. 19, 1999, pp. 1695-1699.
Search report corresponding to European Patent Office Application No. 06123680.8-1237.

* cited by examiner

*Primary Examiner* — Fritz Alphonse
(74) *Attorney, Agent, or Firm* — K&L Gates LLP

(57) ABSTRACT

A packet transmission apparatus is provided. The packet transmission apparatus transmits a packet having a limited arrival deadline through a best-effort network. The packet transmission apparatus includes an automatic packet retransmission section to control retransmission of an undelivered packet, a forward error correction coding section to add a redundant packet to a data packet block, and a redundancy determining section to dynamically determine redundancy of the redundant packet based on observed network state information, so that a loss rate after error correction at a receiver achieved by only the retransmission of the undelivered packet satisfies an allowable loss rate after error correction.

13 Claims, 14 Drawing Sheets

FIG. 8

| NUMBER OF DATA PACKET PER FEC BLOCK | RTT (msec) | | | | |
|---|---|---|---|---|---|
| | 10 | 30 | 50 | 70 | 110 |
| 1 | 0 | 1 | 1 | 2 | 3 |
| 3 | 0 | 1 | 1 | 2 | 5 |
| 5 | 0 | 1 | 2 | 3 | 6 |
| 7 | 0 | 1 | 2 | 3 | 6 |
| 9 | 0 | 1 | 2 | 3 | 7 |
| 11 | 0 | 1 | 2 | 4 | 8 |
| 13 | 0 | 1 | 2 | 4 | 8 |
| 15 | 0 | 1 | 2 | 4 | 9 |
| 17 | 0 | 1 | 2 | 4 | 10 |
| 19 | 0 | 1 | 2 | 4 | 10 |

FIG. 12

| TOTAL TRANSMISSION RATE-RETRANSMISSION DATA RATE (kbps) | RTT (msec) | | | | | |
|---|---|---|---|---|---|---|
| | 10 | 30 | 50 | 70 | 110 | |
| 500 | 0 | 1 | 1 | 2 | 5 | |
| 1000 | 0 | 1 | 2 | 3 | 6 | |
| 1500 | 0 | 1 | 2 | 3 | 6 | |
| 2000 | 0 | 1 | 2 | 3 | 7 | |
| 2500 | 0 | 1 | 2 | 4 | 8 | |
| 3000 | 0 | 1 | 2 | 4 | 8 | |
| 3500 | 0 | 1 | 2 | 4 | 9 | |
| 4000 | 0 | 1 | 2 | 4 | 10 | |
| 4500 | 0 | 1 | 2 | 4 | 10 | |

PACKET TRANSMISSION APPARATUS, COMMUNICATION SYSTEM AND PROGRAM

CROSS REFERENCES TO RELATED APPLICATIONS

The present application claims priority to Japanese Patent Application JP 2005-324224 filed in the Japanese Patent Office on Nov. 9, 2005, the entire contents of which being incorporated herein by reference.

BACKGROUND

The present disclosure relates to a technique which is suitable for a case where a packet limited in arrival deadline is transmitted through a best-effort network.

The disclosure includes aspects of a packet transmission apparatus, a communication system and a program.

In recent years, there is increasing an opportunity to transfer multimedia data through a best-effort communication network. In this type of data transfer, a download transmission system or a stream transmission system is used.

As the best-effort communication network, for example, the Internet is famous. Besides, the multimedia data includes, for example, a video files, audio files, combinations of these, and data including these as part. In the present disclosure, the multimedia data is used in the meaning of data including time information or information relating to a playout order.

In the case of the download transmission system, a data file is downloaded from a delivery server to a recording area at a receiver, and at the point in time when the transfer has completely ended, the playout thereof is started. Accordingly, the download transmission system is unsuitable for the playout of multimedia data in which the playout takes a long time, or for the playout of multimedia data in which a real time playout is required.

On the other hand, in the case of the stream transmission system, the playout of a data file is started by only partial data being transferred from a sender to a receiver. Thus, this is used for Internet telephone, remote video conference, vide on demand, network camera, Internet television and other services.

As an Internet technique suitable for the stream transmission system, there is an RTP (Realtime Transport Protocol) system defined in IETF RFC3550. In the data transfer by the RTP system, as time information, a time stamp is added to a packet. By this, the grasp of a time relation becomes possible between the sender and the receiver, and synchronous playout becomes possible without being influenced by delay fluctuation (jitter) or the like at the time of packet transfer.

Here, in the RTP system, data transfer in real time is not guaranteed. Actually, the priority of packet delivery, setting, management and the like do not fall within the scope of the transport service provided by the RTP system. Thus, also in the case of the RTP packet, similarly to other packets, there is a possibility that a delivery delay or packet loss occurs.

Even if such a state occurs, the receiver uses only packets having arrived in an expected time and can reproduce the data.

This is because even if a slight data loss exists in the video data or audio data, the playout can be performed to a certain extent.

Incidentally, a packet which is delay-delivered or a packet in which an error occurs is discarded at the receiver. That is, there is a problem that even if the transmission apparatus delivers high quality data, when the packet loss or error occurs, the playout is not performed at the receiver.

Especially, in the present communication environment, it is said that there is an error of $10^{-5}$ even in a wired section, and $10^{-3}$ or more in a wireless section. Accordingly, from the viewpoint of quality maintenance, even if the RTP system is singly used for the delivery of the multimedia data, sufficient reliability can not be obtained.

Then, it is conceivable to apply a TCP (transmission control protocol) system with high reliability.

However, although the TCP system is resistant to error, the throughput is low, the delay is large, and it is unsuitable for the stream transmission.

Then, as a method of improving the reliability of data transfer by using the RTP system, it is examined to combine an automatic retransmission system (hereinafter referred to also as "ARQ (Auto Repeat reQuest) system") and a forward error correction coding system (hereinafter referred to also as "FEC (Forward Error Correction) system").

The ARQ system is a system in which a lost packet is detected by using the sequence number of the RTP packet, and retransmission of the lost packet is requested from the receiver to the sender.

The FEC system is a system in which plural packets are made one FEC block and are redundancy-coded by using Reed-Solomon (RS: Reed-Solomon code) or another error correction code. For example, in the case where an (n,k) RS code is used, n−k redundant packets can be created from k original packets before the redundancy coding. Incidentally, n>k is established. In this case, n packets in total are transmitted from the transmission apparatus. On the other hand, in the reception apparatus, when k packets can be received among the n packets, k original packets can be restored by the RS decoding processing.

However, the ARQ system and the FEC system respectively have problems as described below.

In the ARQ system, in the case of an environment in which an allowable playout delay (interval between packet transmission time and packet playout time) is not sufficiently large with respect to a round trip time (RTT), since a retransmission request processing and a packet retransmission processing can not be completed in a period, the original effect can not be exhibited.

In the FEC system, since the decoding processing can not be performed when even one packet is missing in an FEC block, in order to realize the packet recovery rate equal to that of the ARQ system, it is necessary to transmit more redundant packets than the ARQ retransmission packets, and there is a problem that the congestion of the network is increased. Besides, there is a problem that the transmission rate of original data is unnecessarily reduced.

SUMMARY

Then, the present disclosure provides a transmission technique which causes the retransmission system (ARQ system) of an undelivered packet and the forward error correction coding system (FEC system) to effectively and cooperatively operate.

That is, there is proposed a transmission technique to provide following processing functions in a packet transmission apparatus which transmits a packet limited in arrival deadline through a best-effort network.

(a) A packet automatic retransmission function to control retransmission of an undelivered packet.

(b) A forward error correction coding function to add a redundant packet to a data packet block.

(c) A redundancy determination function to dynamically determine redundancy of the redundant packet added to the data packet block based on observed network state information so that a loss rate after error correction at a receiver achieved by only the retransmission of the undelivered packet satisfies an allowable loss rate after error correction.

According to an embodiment, the redundancy of the redundant packet can be optimized according to the state of the network. By this, without unnecessarily increasing the congestion of the network or unnecessarily reducing the transmission amount of the data packet block, the loss rate after error correction at the receiver can be kept within an allowable range.

Additional features and advantages are described herein, and will be apparent from, the following Detailed Description and the figures.

BRIEF DESCRIPTION OF THE FIGURES

FIG. 8 is a view showing an example of a redundancy table.

FIG. 12 is a view showing an example of a redundancy table.

DETAILED DESCRIPTION

Hereinafter, embodiments of a communication system provided with a transmission technique of the invention are described.

Incidentally, a known technique in this technical field is applied to a portion which is not particularly illustrated or described in the present specification.

(A) Embodiment 1

In this embodiment, a description is given to a communication system which performs streaming transmission of video data through the Internet.

In this embodiment, it is assumed that there is no limitation in the total transmission rate of packets. In the present specification, the total transmission rate means the sum total of the transmission rate of a video data packet block, the transmission rate of an error correction packet, and the transmission rate of a retransmission packet.

Incidentally, the video data packet block, the error correction data, and the retransmission packet respectively correspond to "data packet block", "redundant packet" and "undelivered packet" of claims.

(A-1) Example of System Structure

Figure 1:
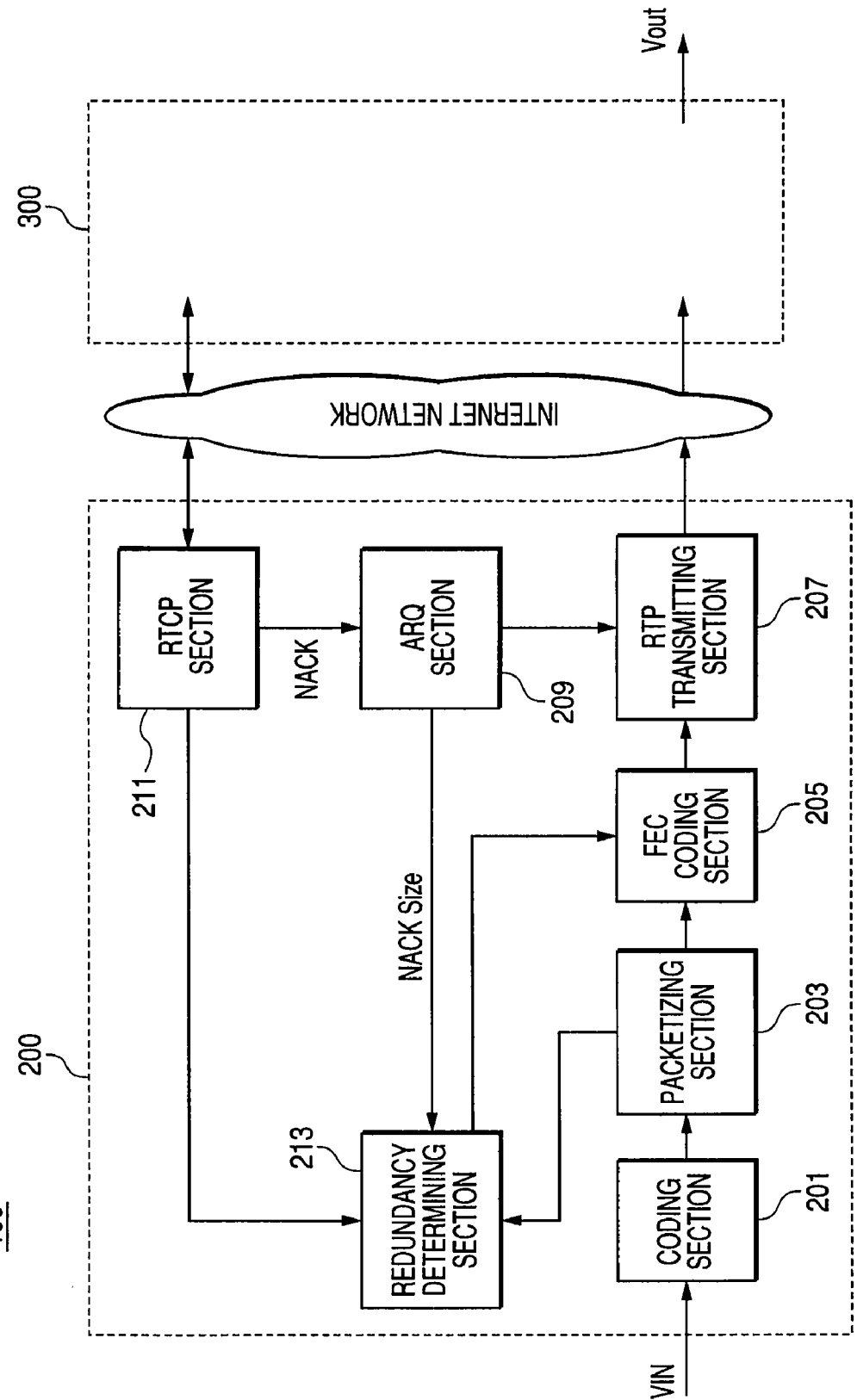
FIG. 1 is a view showing a structural example of a transmission apparatus constituting a communication system.
Figure 2:
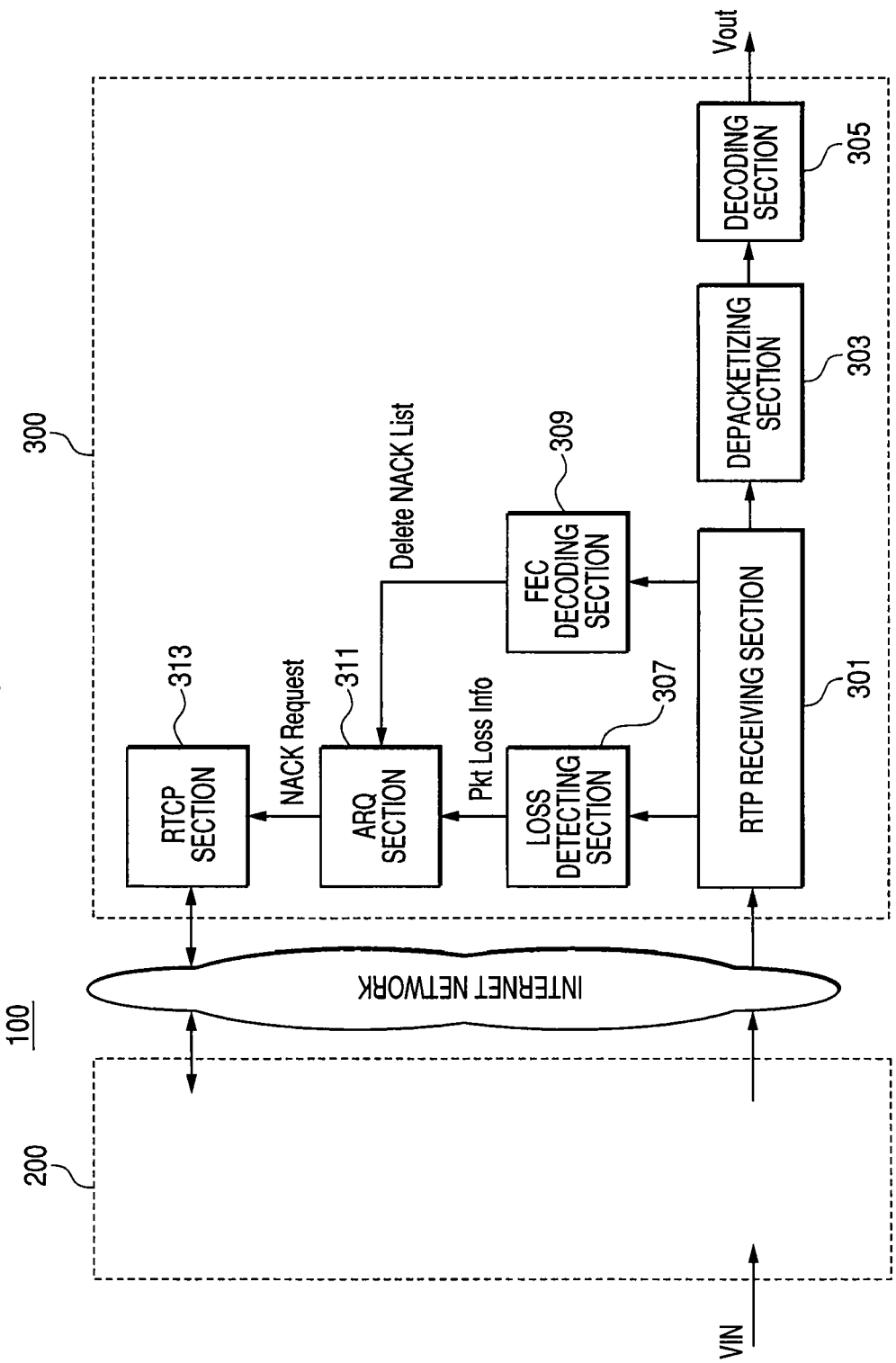
FIG. 2 is a view showing a structural example of a reception apparatus constituting the communication system.

FIG. 1 and FIG. 2 show structural examples of a transmission apparatus and a reception apparatus constituting a communication system. FIG. 1 and FIG. 2 show a case where a communication system 100 includes one transmission apparatus 200 and one reception apparatus 300.

The transmission apparatus 200 (FIG. 1) includes a coding section 201, a packetizing section 203, an FEC coding section 205, an RTP transmitting section 207, an ARQ section 209, an RTCP (RTP Control Protocol) section 211, and a redundancy determining section 213.

The ARQ section 209 corresponds to the packet automatic retransmission function to control the retransmission of a retransmission packet. The FEC coding section 205 corresponds to the forward error correction coding function to add error correction data to the video data packet block.

The redundancy determining section 213 corresponds to the redundancy determination function to dynamically determine, based on observed network state information, the redundancy of the redundant packet added to the video data packet block so that the loss rate after error correction at the receiver achieved by only the retransmission of the undelivered packet satisfies the allowable loss rate after error correction.

In the case of this embodiment, the network information is given as the round trip time RTT and the packet loss rate. Although the network information can be given by only the round trip time RTT, the accuracy of predicting the state of the network is lowered than the case where the packet loss rate is added.

Well-known techniques are applied to all of the other communication processing functions.

The reception apparatus 300 (FIG. 2) includes an RTP receiving section 301, a depacketizing section 303, a decoding section 305, a loss detecting section 307, an FEC decoding section 309, an ARQ section 311, and an RTCP section 313.

Well-known techniques are applied to all these communication processing functions. The RTCP section 313 is a processing function section to periodically transmit an RTCP packet for adjustment of the transmission rate or the like of the transmission apparatus 200. As the RTCP packet, for example, a packet loss rate or a NACK packet is transmitted.

(A-2) Processing Algorithm

Hereinafter, a processing algorithm executed in the communication system 100 is divided into a normal transmission processing and an error correction processing and is described.

(a) Normal Transmission Processing

The transmission apparatus 200 is connected to an image output apparatus, such as a video camera, through a video input interface $V_{IN}$. The video data inputted through the $V_{IN}$ is subjected to video compression processing in the coding section 201, and then is given to the packetizing section 203 and is RTP packetized.

Thereafter, error correction data is added to the video data in the FEC coding section 205.

That is, the video data is FEC-redundancy-coded. The FEC-redundancy-coded video data is given to the RTP transmitting section 207, and is transmitted as the RTP packet to the Internet network.

The reception apparatus 300 receives the RTP packet by the RTP receiving section 301, and reconstructs it into compressed video data in the depacketizing section 303. Thereafter, the decoding section 305 releases the compression processing of the reconstructed compressed video data. The decoded video data is outputted through a video output interface $V_{OUT}$ to a video displaying apparatus such as, for example, a display.

(b) Error Correction Processing

The error correction processing is divided into three processings including "FEC processing", "ARQ processing" and "redundancy determination processing," and are described below.

In the FEC processing, redundancy coding by the FEC system, and decoding processing are executed. Besides, in the "ARQ processing", retransmission control by the ARQ system is executed. Besides, in the "redundancy determination processing", a processing is executed which determines the redundancy by the FEC from the network state information, the ARQ retransmission packet amount, and the data rate of data packet block such as video data. This "redundancy determination processing" is the main part of the transmission technique proposed in this specification.

(b1) FEC Processing

In the "FEC processing", in the transmission apparatus 200, the redundant coding processing of the original data based on the redundancy determined by the "redundancy determination processing" is executed. On the other hand, in the reception apparatus 300, the decoding processing is executed. For the FEC redundancy coding, a loss error correction code such as, for example, Reed-Solomon code is used and the redundancy coding processing is executed.

The redundancy from the "redundancy determination processing" is specified in the form of (number of original data packet, number of redundant packet).

In this specification, a pair of (number of original data packet, number of redundant packet) is treated as one redundant code unit, the so-called FEC block. For example, in the case where (number of original data packet, number of redundant packet)=(10, 5) is specified, 5 redundant packets are created for 10 original data packets by the FEC processing in the transmission apparatus 200, and 15 packets in total are transmitted in this FEC block. In the reception apparatus 300, when 10 packets in the FEC block packets are received, the original data can be decoded by the FEC decoding processing.

Figure 3:
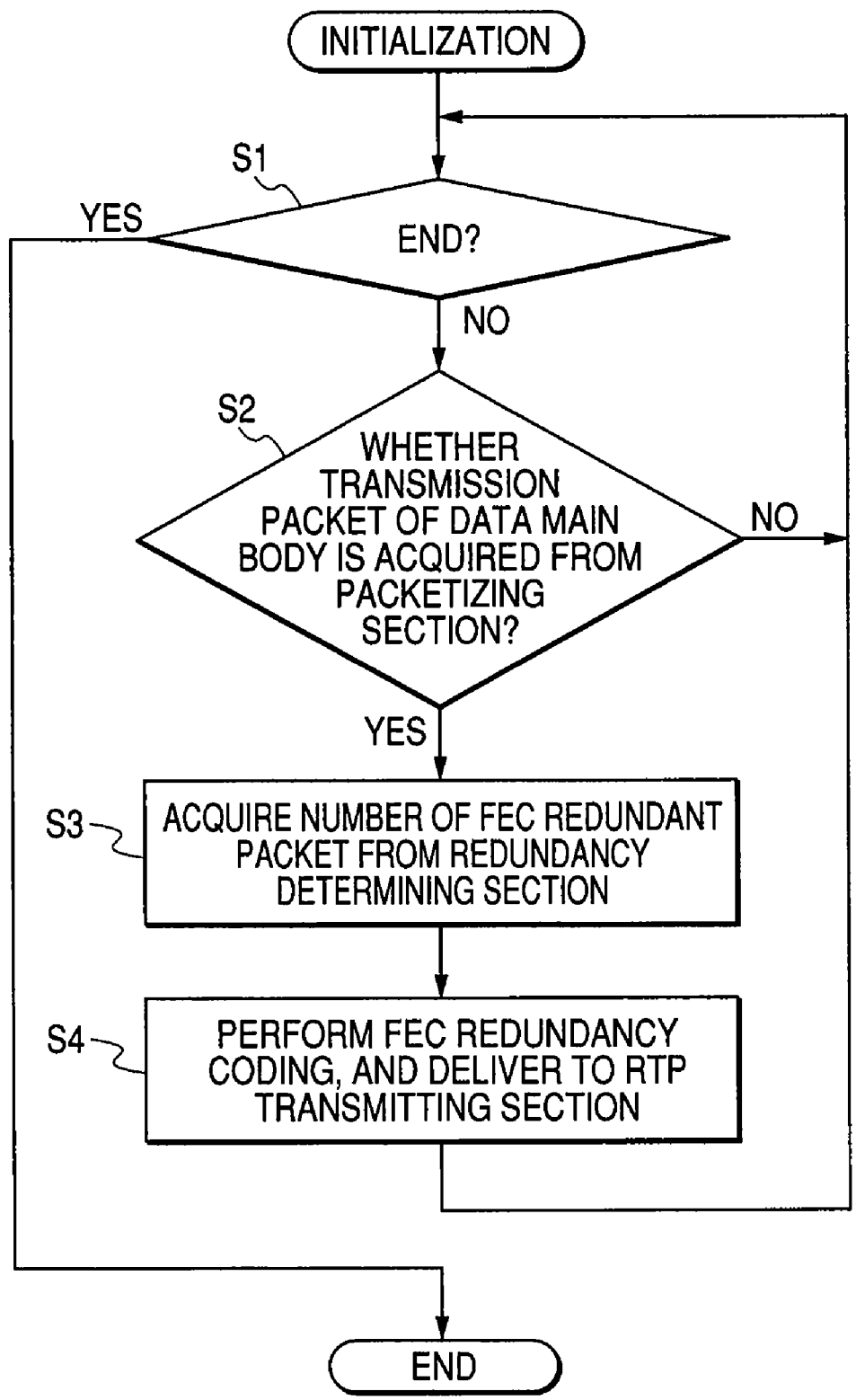
FIG. 3 is a view showing an example of FEC processing executed at the transmission apparatus.
Figure 4:
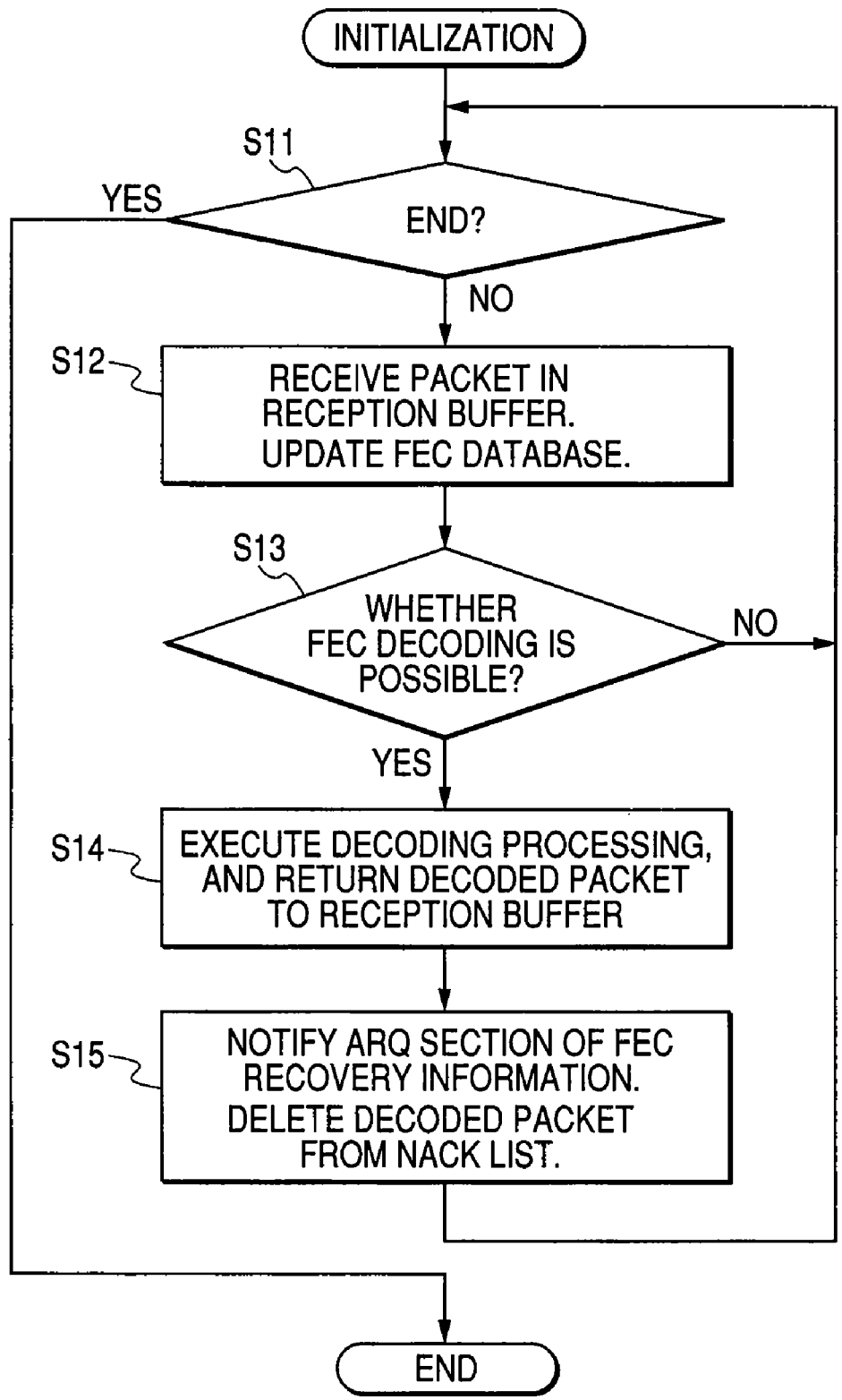
FIG. 4 is a view showing an example of FEC processing executed at the reception apparatus.

FIG. 3 and FIG. 4 show a processing procedure executed in the "FEC processing". FIG. 3 shows the processing procedure at the transmission apparatus 200, and FIG. 4 shows the processing procedure at the reception apparatus 300.

The FEC coding section 205 at the transmission apparatus 200 first determines whether or not the FEC processing is to be ended (S1).

In the case where a negative result is obtained in the processing S1, the FEC coding section 205 determines whether or not the transmission packet of a video data packet block inputted from the packetizing section 203 is acquired (S2).

During the period when the negative result is obtained in the processing S2, the FEC coding section 205 repeats the judgment processing of the processing S1 and the processing S2.

On the other hand, in the case where an affirmative result is obtained in the processing S2, the FEC coding section 205 acquires a number of redundant packets used in the FEC processing from the redundancy determining section 213 (S3).

Thereafter, the FEC coding section 205 redundancy-codes the transmission packets based on the acquired number of the redundant packet, and delivers the coding result to the RTP transmitting section 207 (S4).

On the other hand, also the FEC decoding section 309 at the reception apparatus 300 first determines whether or not the FEC processing is to be ended (S11).

In the case where a negative result is obtained in the processing S11, the FEC decoding section 309 receives a packet in the reception buffer, and updates the FEC database (S12).

Thereafter, the FEC decoding section 309 determines whether or not the FEC decoding can be performed by the received packet (S13).

During the period when the negative result is obtained in the processing S13, that is, until the FEC decoding becomes possible, the FEC decoding section 309 repeats the judgment processing of the processing S11 and the processing S12.

On the other hand, in the case where the affirmative result is obtained in the processing S13, the FEC decoding section 309 executes the decoding processing, and returns the decoded packet to the reception buffer (S14).

Thereafter, the FEC decoding section 309 gives the FEC recovery information to the ARQ section 311, and deletes the decoded packet from the NACK list (S15). These processings are repeatedly executed until the end of the FEC processing is confirmed.

(b2) ARQ Processing

In the "ARQ processing", a retransmission request packet (that is, NACK packet) to request retransmission of a lost packet (undelivered packet) is transmitted from the reception apparatus 300 to the transmission apparatus 200. In the transmission apparatus 200, the retransmission processing of the undelivered packet of the sequence number specified by the NACK packet is executed.

The detection of the lost packet is executed by the loss detecting section 307 of the reception apparatus 300. The loss detecting section 307 detects, for example, the sequence number recited in the RTP packet header, and in the case where the sequence number of the received RTP packet is not continuous, it is regarded that a packet is lost.

The lost packet is added into the retransmission request list (that is, NACK list) in the ARQ section 311. The ARQ section 311 reads the NACK packet information from the "NACK list" at the specified time, and gives it to the RTCP section 313. The RTCP section 313 transmits the NACK packet to the transmission apparatus 200 based on the "NACK list".

In the "NACK list", two pieces of time information of "NACK timeout" information and "NACK deadline" information are set for the individual NACK packet information.

Here, the ARQ section 311 of the reception apparatus 300 instructs the transmission of the NACK packet at the time point when the packet loss is first detected. On the other hand, in the case where the retransmission packet is not received even at the time point when a specific time has passed from the transmission of the NACK packet (that is, even at the elapsed time point of "NACK timeout"), the ARQ section 311 repeatedly outputs the transmission instruction of the NACK packet until "NACK deadline".

The "NACK timeout" is generally set to a time when an RTT time has passed from the transmission of the NACK packet. The "NACK timeout" is set to a time prior to the packet arrival deadline, such as the packet data playout scheduled time, by the RTT time.

Figure 5:
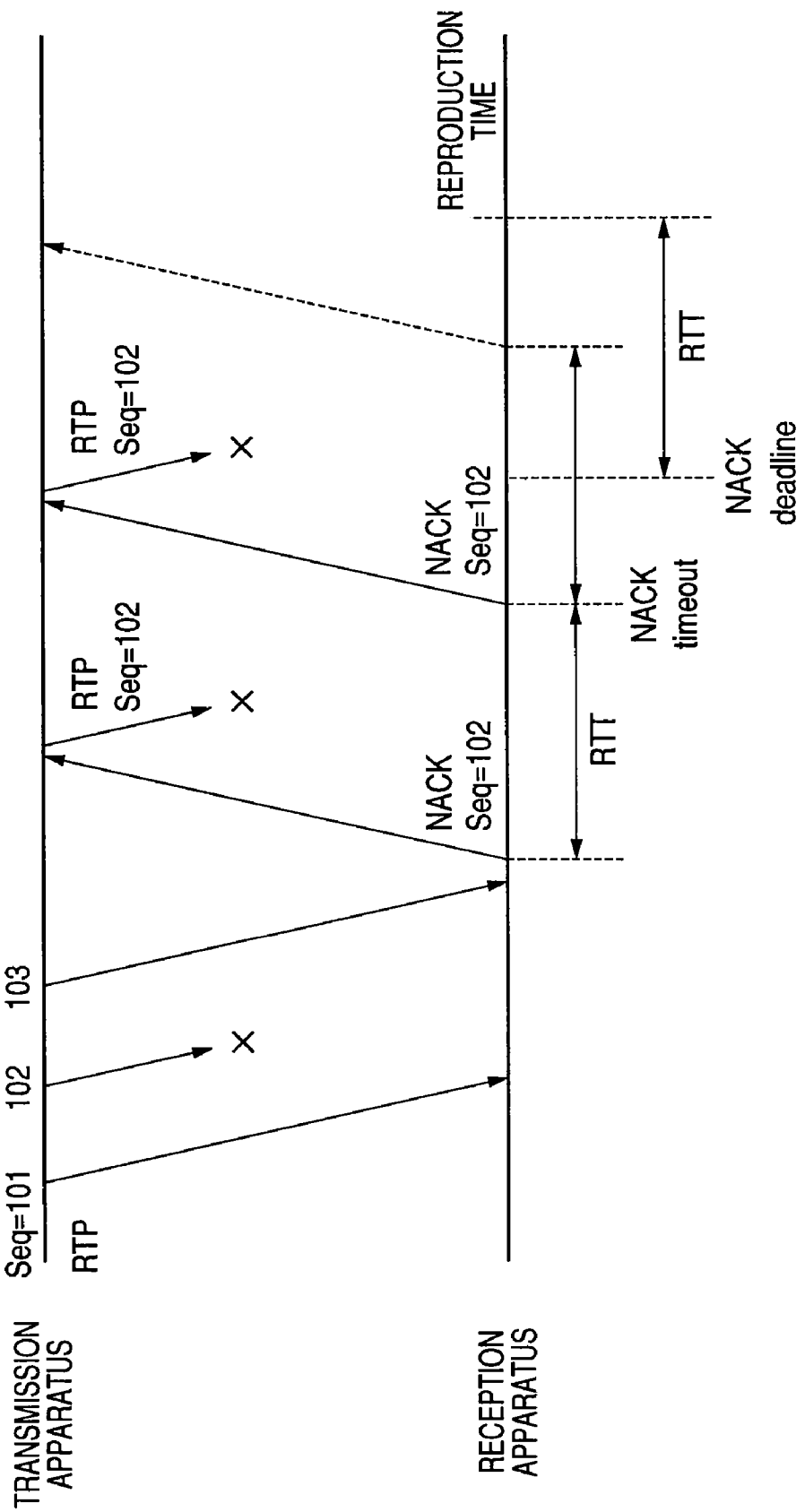
FIG. 5 is a view showing a sequence example of ARQ processing.

FIG. 5 shows a sequence example of the "ARQ processing". FIG. 5 shows the example in which in the case where a packet of a sequence number "102" has become an undelivered packet, although two retransmission packets are also judged to be lost packets, the transmission of the NACK packet is stopped by the arrival of the "NACK deadline".

As the format of the NACK packet, for example, the RTCP NACK packet format described in IETF Internet Draft "Extended RTP Profile for RTCP-based Feedback" is used.

Figure 6:
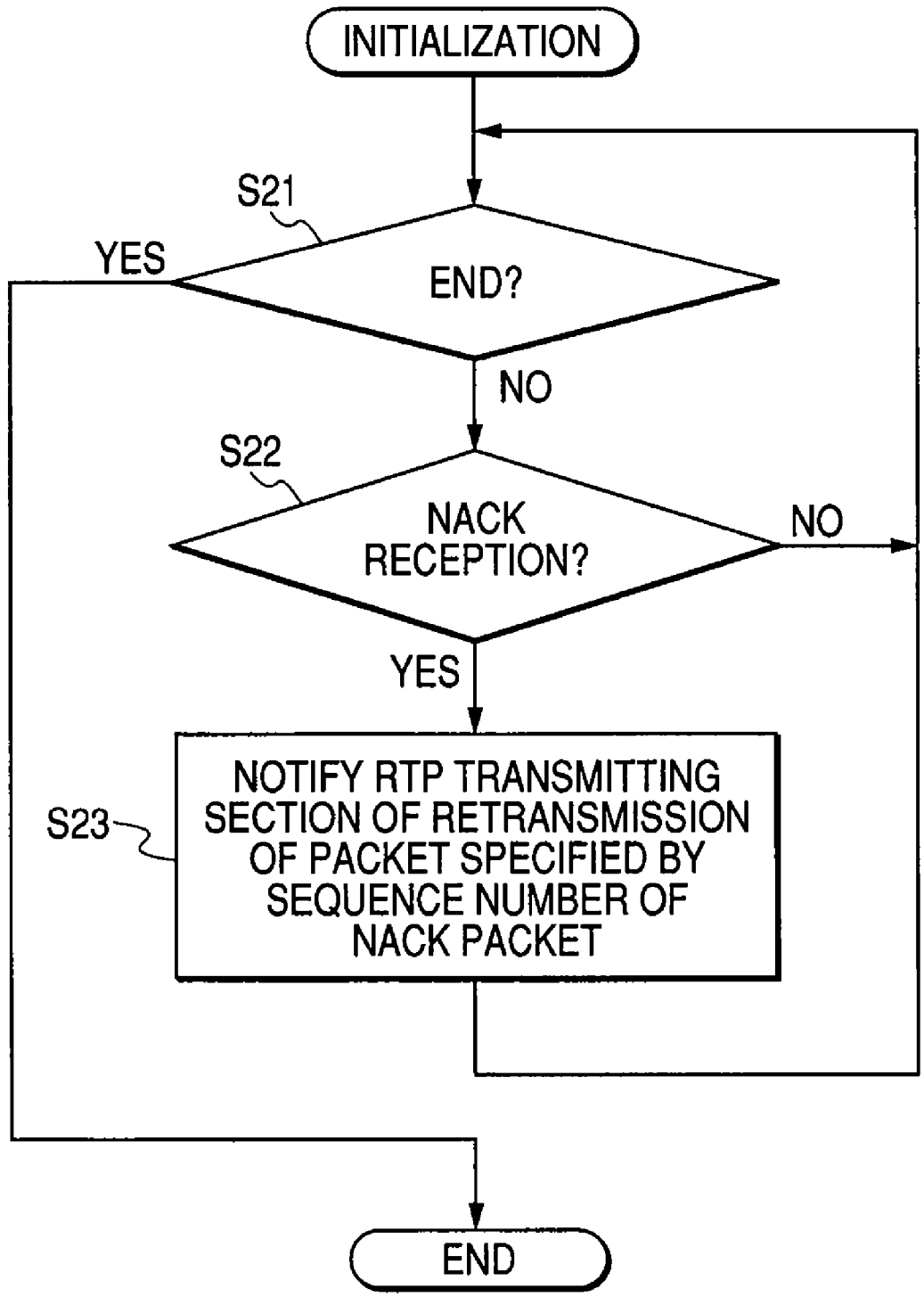
FIG. 6 is a view showing an example of ARQ processing executed at the transmission apparatus.
Figure 7:
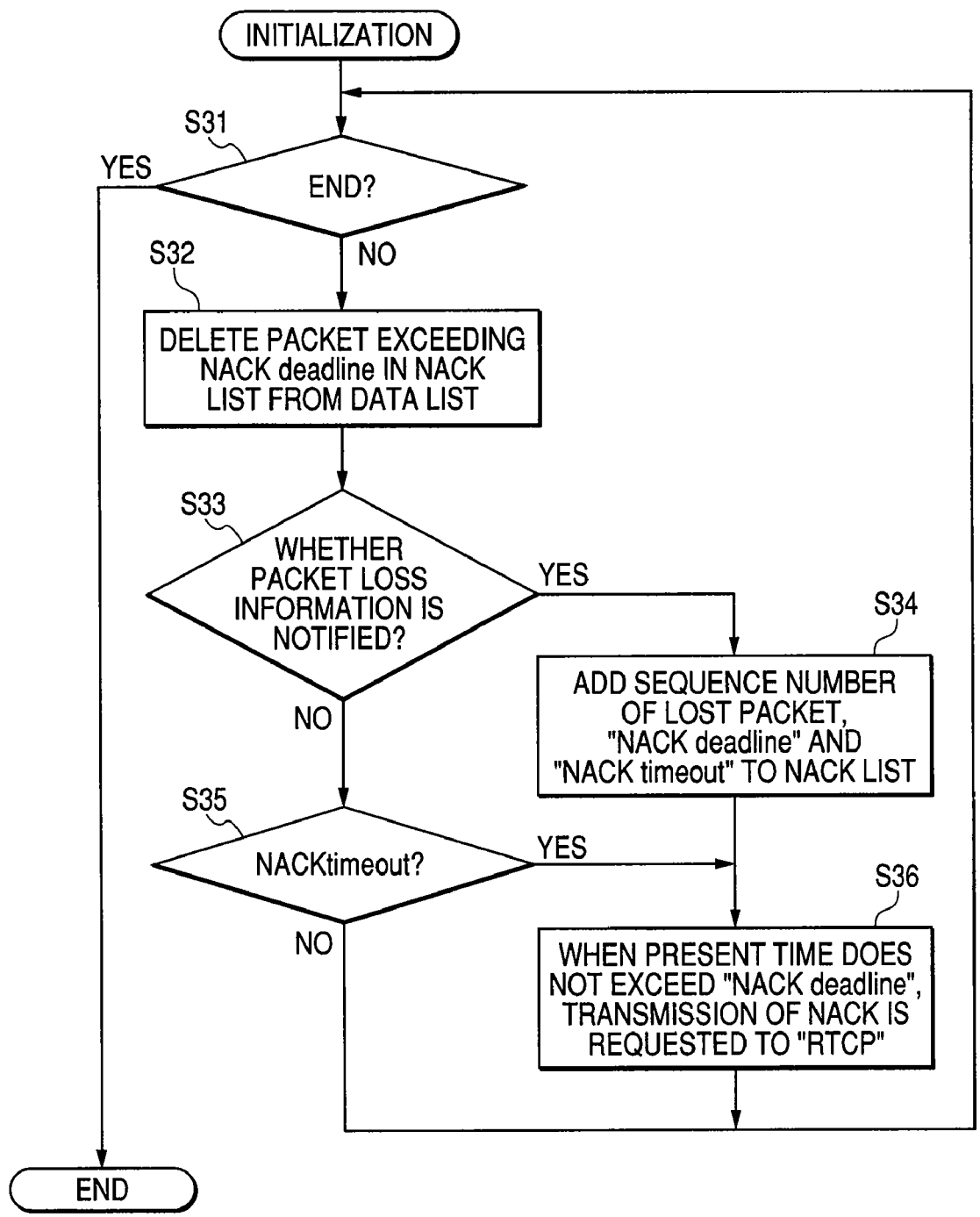
FIG. 7 is a view showing an example of ARQ processing executed at the reception apparatus.

FIG. 6 and FIG. 7 show an example of a processing procedure executed in the "ARQ processing". FIG. 6 shows the processing procedure at the transmission apparatus 200, and FIG. 7 shows the processing procedure at the reception apparatus 300.

The ARQ section 209 at the transmission apparatus 200 first determines whether or not the ARQ processing is to be ended (S21).

In the case where a negative result is obtained in the processing S21, the ARQ section 209 determines whether or not a NACK packet is received (S22).

During the period when the negative result is obtained in the processing S22, the ARQ section 209 repeats the judgment processing of the processing S21 and the processing S22.

On the other hand, in the case where an affirmative result is obtained in the processing S22, the ARQ section 209 notifies the RTP transmitting section 207 of the retransmission of the packet specified by the sequence number of the NACK packet (S23). These processings are repeatedly executed until the end of the ARQ processing is confirmed.

On the other hand, the ARQ section 311 at the reception apparatus 300 also first determines whether or not the ARQ processing is to be ended (S31).

In the case where a negative result is obtained in processing S31, the ARQ section 311 deletes a packet exceeding "NACK deadline" in the NACK list from the data list (S32).

Thereafter, the ARQ section 311 determines whether or not packet loss information is notified (S33).

In the case where an affirmative result is obtained in the processing S33, the ARQ section 311 adds the sequence number of a lost packet, "NACK timeout", and "NACK deadline" to the NACK list (S34).

In the case where a negative result is obtained in the processing S33 (in the case where the NACK packet is already transmitted with respect to the same packet), the ARQ section 311 determines whether or not the "NACK timeout" has passed (S35).

After the execution of the processing S34 or in the case where an affirmative result is obtained in the processing S35, the ARQ section 311 determines whether or not the present time exceeds the "NACK deadline", and in the case where it does not exceed, the ARQ section 311 requests the RTCP section 313 to transmit the NACK packet (S36).

On the other hand, in the case where a negative result is obtained in the processing S35, the ARQ section 31 returns to the processing S31 and executes the series of processings.

(b3) Redundancy Determination Processing

In the "redundancy determination processing", the redundancy of error correction data used in the FEC coding section 205 is determined based on network state information, ARQ retransmission packet amount, and data rate of a data packet block such as video data.

The network state information is obtained from, for example, an RTCP Sender Report (SR) packet and an RTCP Receiver Report (RR) packet described in IETF RFC 3550, which are transmitted/received between the RTCP section 211 of the transmission apparatus 200 and the RTCP section 313 of the reception apparatus 300.

As the network state information, various parameters such as a round trip time (RTT) and a packet loss rate are used.

In this embodiment, the RTCP section 211 obtains a loss rate after error correction achieved by only the retransmission of the undelivered packet from these network parameters, and determines the FEC redundancy necessary for achievement of a target loss rate after error correction.

In the case where there is no packet arrival deadline, since the retransmission request by the ARQ function can be executed infinitely, the target loss rate after error correction can be achieved by only the ARQ.

However, in the case where the packet arrival deadline is limited, the possible number of times of retransmission by the ARQ system is determined by the RTT and the packet arrival deadline, and as the RTT becomes large, the loss rate after error correction by the ARQ becomes high. That is, in the FEC coding section 205, redundancy coding with higher redundancy is required.

As one of examples, consideration will be given to a case where video frame data is made an FEC block unit, a video frame loss rate after error correction is made an index of a target loss rate after error correction.

For example, in the case where the target video frame loss rate after error correction is made less than $10^{-4}$, the redundancy is determined so that a probability that even one packet is lost in the video frame after error correction using the ARQ system and the FEC system is $10^{-4}$ or less.

As the target index, instead of the video frame loss rate, a packet loss rate after error correction can also be used.

In the redundancy determining section 213, for example, based on the RTT information from the RTCP section 211 and the packet number information per video frame from the packetizing section 203, the number of the redundant packets per FEC block is determined.

As the designation of the number of the redundant packet, it is conceivable to apply a system of referring to a previously calculated "redundancy table" or a system of performing calculation each time.

FIG. 8 shows an example of a redundancy table used in the method of referring to the "redundancy table". FIG. 8 shows the example of the redundancy table necessary for keeping the video frame loss rate after error correction to be a specific value or less under the environment of a random packet loss rate, while a packet loss rate of a network is not used as a parameter. That is, in the example of the redundancy table, only the RTT is made the parameter.

Incidentally, in addition to the RTT information, the packet loss rate is also added as the parameter. In this case, a three-dimensional redundancy table is required.

As in this example, in the case where the video frame is made the FEC block unit, in order to keep the video frame loss rate after error correction to be a specific value or higher, the ratio of the number of the required FEC packet to the number of the data packet is changed according to the number of the data packet per FEC block.

Figure 9:
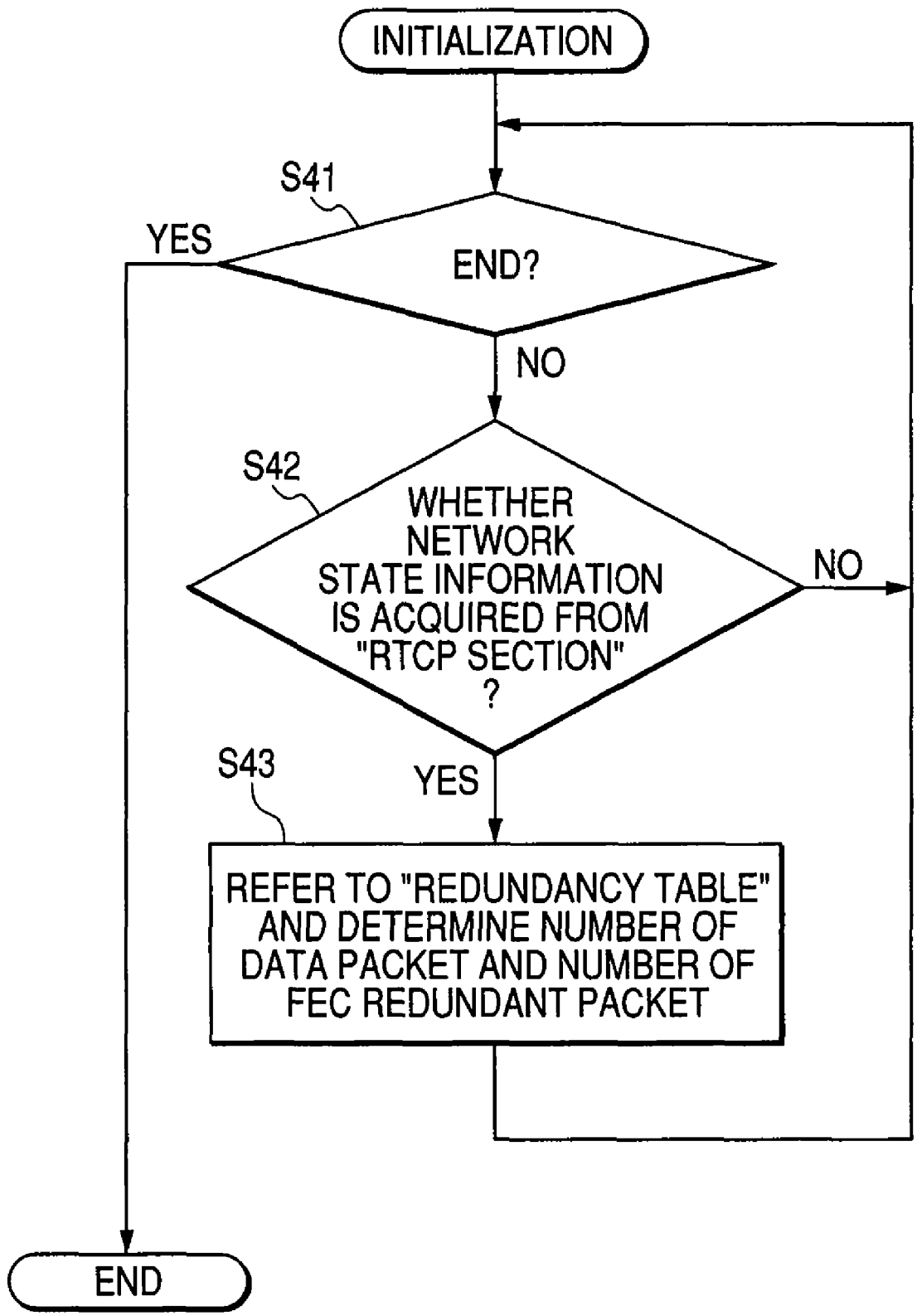
FIG. 9 is a view showing an example of redundancy determination processing.

FIG. 9 shows a processing procedure executed in the "redundancy determination processing".

The redundancy determining section 213 at the transmission apparatus 200 first determines whether or not the redundancy determination processing is to be ended (S41).

In the case where a negative result is obtained in the processing S41, the redundancy determining section 213 determines whether or not the network state information is acquired from the RTCP section 211 (S42).

During the period when the negative result is obtained in the processing S42, the redundancy determining section 213 repeats the judgment processing of the processing S41 and the processing S42.

On the other hand, in the case where an affirmative result is obtained in the processing S42, the redundancy determining section 213 refers to the "redundancy table", determines the number of the data packet and the number of the FEC redundant packet, and gives these to the FEC coding section 205. These processings are repeatedly executed until the end of the redundancy determination processing is confirmed.

As described before, in the case where the video frame is made the FEC block unit, the packet loss rate after error correction by only the ARQ and the video frame loss rate after error correction by the ARQ and the FEC can be calculated by a following expression (mathematical expression 1).

By this expression, the number of the redundant packet necessary for achieving a desired video frame loss rate after error correction can be calculated.

$$P_{arq} = P_1^{(N_{net}+1)}(2 - P_1)^{N_{net}}$$

$$P_{fec\_arq} = 1 - \left( \sum_{k=0}^{N_F} {}_{(N_D+N_F)}C_k P_{arq}(1 - P_{arq})^{(N_D+N_F-k)} \right)$$

[Mathematical Expression 1]

$P_1$: packet loss rate (random packet loss rate)
$P_{arq}$: packet loss rate after error correction by only ARQ
$P_{fec\_arq}$: video frame loss rate after error correction by ARQ and FEC
$N_D$: number of original data packet per video frame
$N_F$: number of redundant packet per video frame
$N_{net}$: the possible number of times of ARQ retransmission (A-3) Effects of the Embodiments As described above, when the redundancy determining section 213 is provided in the transmission apparatus 200, and the redundancy of the redundant packet is optimized according to the state of the network, the loss rate after error correction at the receiver can be kept within the allowable range without unnecessarily increasing the congestion of the network.

For example, in the case where the round trip time (RTT) is small, a specified loss rate after error correction can be achieved by the retransmission of the undelivered packet. Thus, the redundancy of the redundant packet becomes minimum, and it is possible to avoid the state where the network is unnecessarily congested.

Besides, in the case where the round trip time (RTT) is large, a requested loss rate after error correction can not be realized by only the retransmission of the undelivered packet. However, the required loss rate after error correction can be achieved by increasing the redundancy of the redundant packet.

Figure 10:
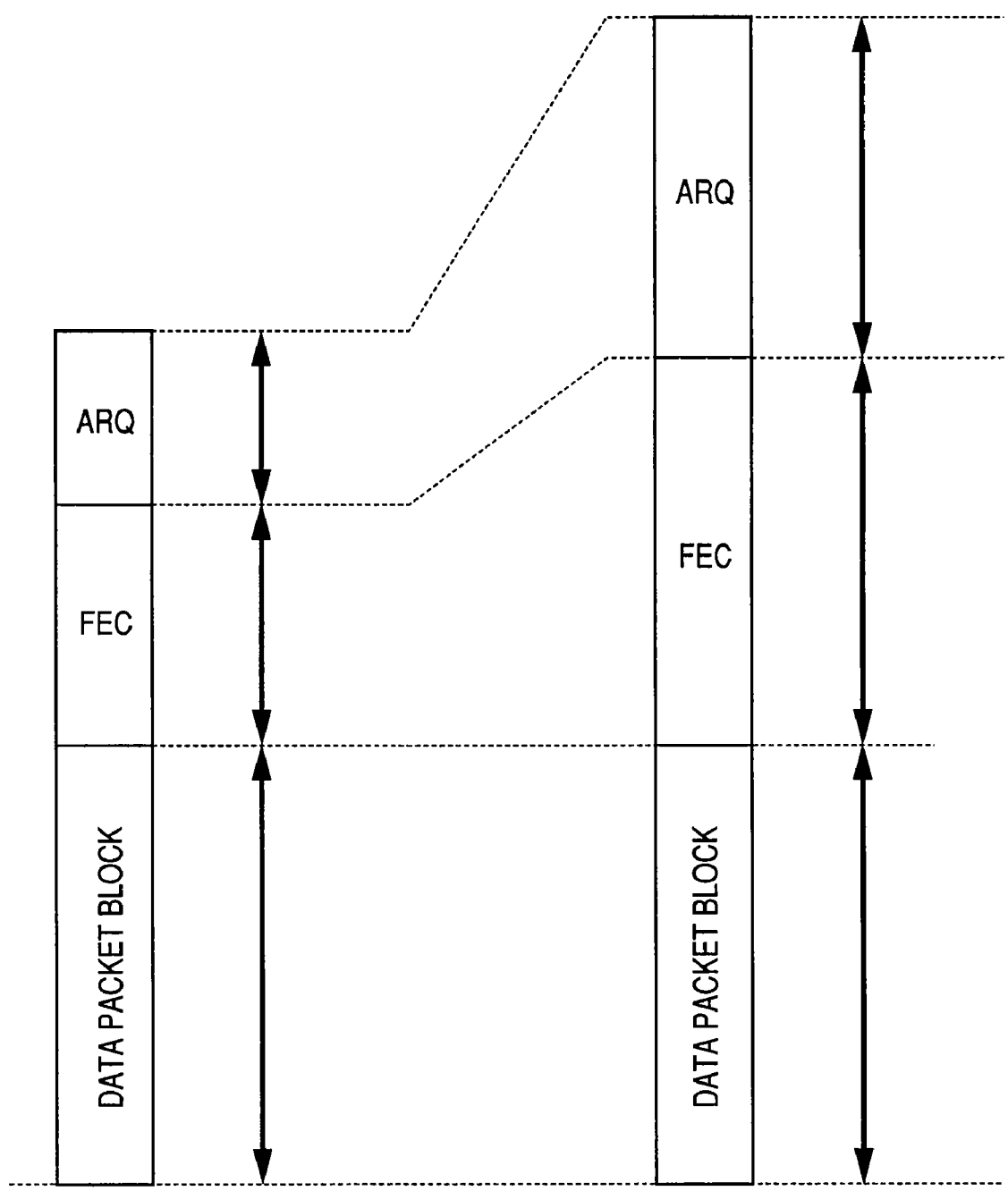
FIG. 10 is a view showing a control image of redundancy executed in embodiment 1.

FIG. 10 shows an image of this processing. From FIG. 10, it is understood that even if the transmission rate of the data packet block is constant, the redundancy of the redundant packet is increased/decreased according to the round trip time of the network.

Besides, by adopting this redundancy determining section 213, it is possible to eliminate the necessity that the user using the transmission apparatus 200 manually changes the setting of the error correction system. As a result, user convenience is enhanced.

Besides, the amount of data transmission necessary for error correction can be minimized. Thus, a large transmission amount can be assigned to the transmission of the data packet block. In this way, in the case of the video transmission, as compared with the related art, higher quality video transmission can be realized.

(B) Embodiment 2

Also in this embodiment, a description will be given to a communication system which performs streaming transmission of video data through the Internet.

However, in this embodiment, it is assumed that the usable total transmission rate is limited by transmission rate control in shared media, or restriction of bandwidth reservation, or restriction of a physical network.

(B-1) System Structural Example

Figure 11:
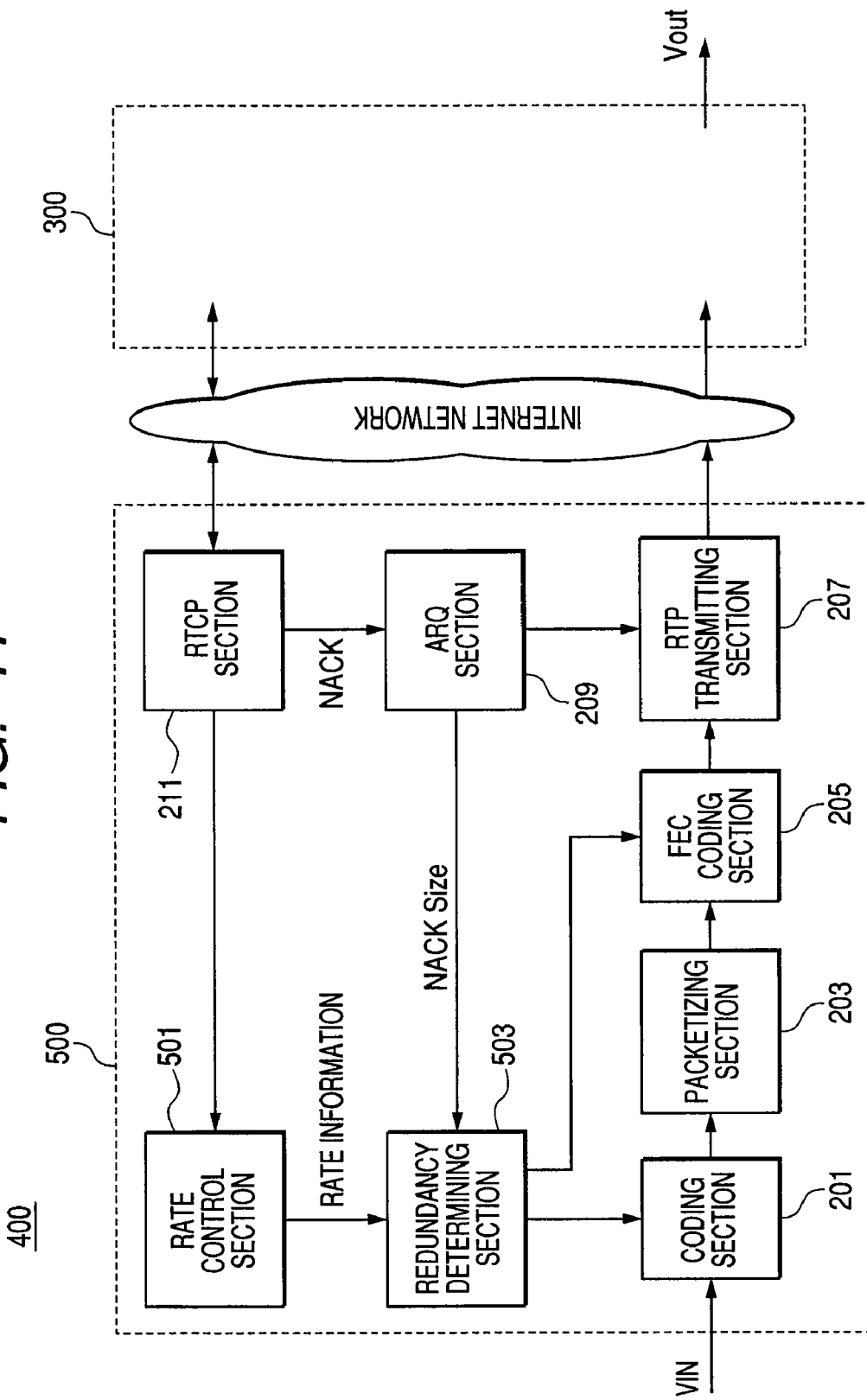
FIG. 11 is a view showing a structural example of a transmission apparatus constituting a communication system.

FIG. 11 shows a structural example of a transmission apparatus and a reception apparatus constituting a communication system. FIG. 11 shows a case where a communication system 400 includes one transmission apparatus 500 and one reception apparatus 300 (FIG. 2). That is, the structure of the reception apparatus 300 is the same as that of embodiment 1.

The transmission apparatus 500 (FIG. 11) includes a coding section 201, a packetizing section 203, an FEC coding section 205, an RTP transmitting section 207, an ARQ section 209, an RTCP section 211, a rate control section 501, and a redundancy determining section 503.

The difference from embodiment 1 is the two sections of the rate control section 501 and the redundancy determining section 503.

(B-2) Processing Algorithm

Hereinafter, a processing algorithm executed in the communication system 400 will be described. Incidentally, the processing algorithm of the embodiment 2 is different from the processing algorithm of the embodiment 1 only in two points, that is, the addition of "rate control processing" and the content of "redundancy determination processing". Accordingly, in the following, only these two processing functions will be described.

(a) Rate Control Processing

The rate control processing is performed in accordance with, for example, IETF RFC3448 "TCP Friendly Rate Control (TFRC): Protocol Specification". The rate control section 501 in the transmission apparatus 500 determines the total transmission rate of the data packet block, the redundant packet data by the FEC, and the retransmission data by the ARQ based on the network information, such as the packet loss rate and RTT, from the RTCP section 211. In the case of a well-known processing system, although the total transmission rate information is notified to only the coding section 201 and the RTP transmitting section 207, in the case of this embodiment, the total transmission rate information is notified to the redundancy determining section 503.

(b) Redundancy Determination Processing

The "redundancy determination processing" determines, in the redundancy determining section 503 of the transmission apparatus 500, the video frame data size to be notified to the coding section 201 and the redundancy to be notified to the FEC coding section 205 based on the total transmission rate notified from the rate control section 501, the packet loss rate and the RTT notified from the RTCP section 211, and the retransmission data size notified from the ARQ section 209.

Incidentally, in the case of the embodiment 1, although the number of the original data packet is notified from the packetizing section 203 to the redundancy determining section 213, in the case of this embodiment, the data size and the redundancy are adjusted in the redundancy determining section 503 so that the total of the transmission rate of the retransmission data, the transmission rate of the FEC redundant packet, and the transmission rate of the data packet block becomes the total transmission rate notified from the rate control section 501, and are notified to the coding section 201 and the FEC coding section 205.

Also in this embodiment, FIG. 12 shows an example of a redundant table of a case where the video frame data is made the FEC block unit, and the video frame loss rate after error correction is made a specific value or less.

In this redundancy table, the transmission rate obtained by subtracting the transmission rate (retransmission data rate) necessary for transmission of the retransmission packet from the total transmission rate is made the present value, and the number of the FEC redundant packet per FEC block is determined according to the relation between this present value and the RTT value.

Figure 13:
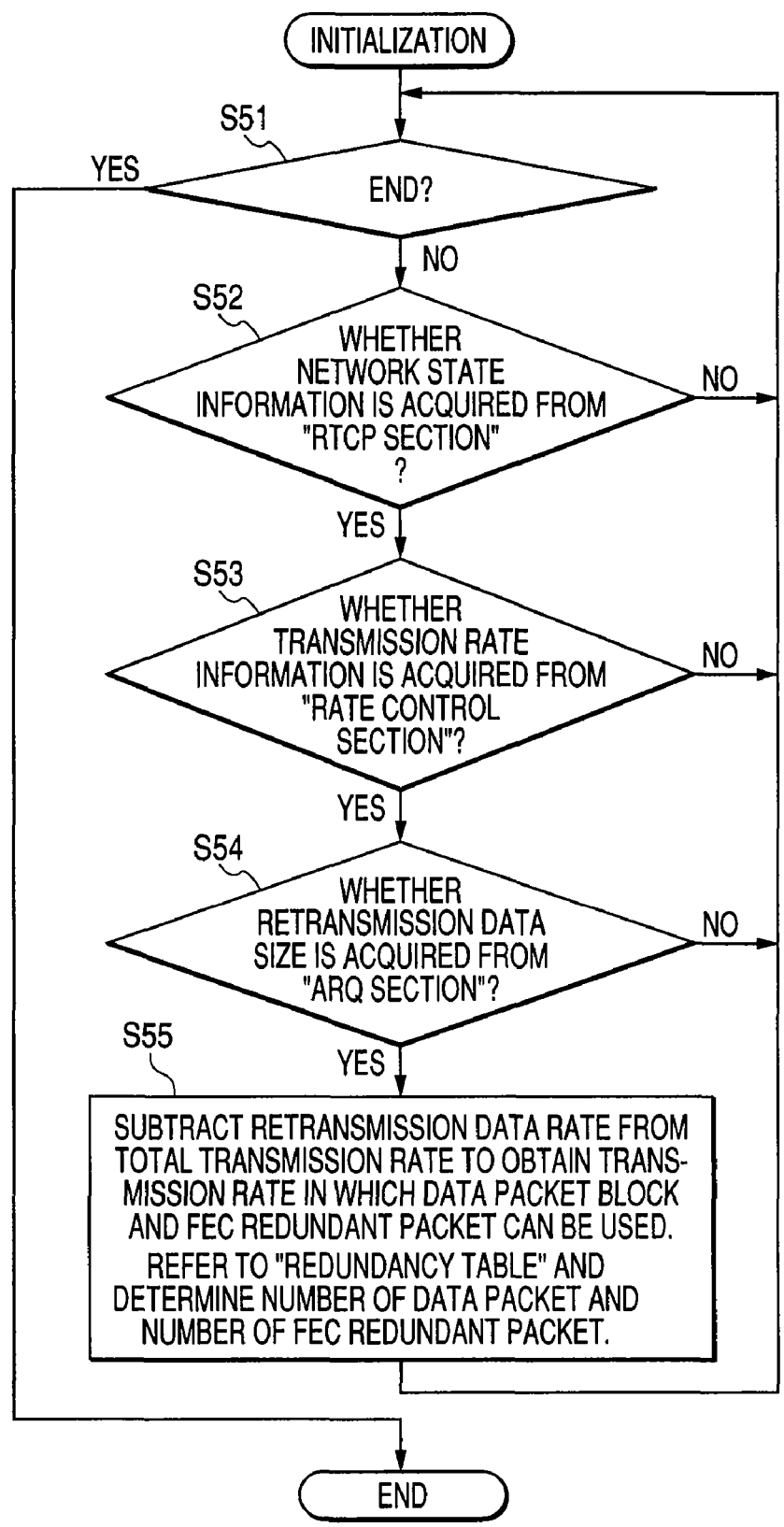
FIG. 13 is a view showing an example of redundancy determination processing.

FIG. 13 shows a processing procedure executed in the "redundancy determination processing".

Here, the redundancy determining section 503 first determines whether or not the redundancy determination processing is to be ended (S51).

In the case where a negative result is obtained in the processing S51, the redundancy determining section 503 determines whether or not network state information is acquired from the RTCP section 211 (S52).

During the period when the negative result is obtained in the processing S52 (until the acquisition of the network state information is confirmed), the redundancy determining section 503 repeats the judgment processing of the processing S51 and the processing S52.

On the other hand, in the case where an affirmative result is obtained in the processing S52, the redundancy determining section 503 determines whether or not transmission rate information is acquired from the rate control section 501 (S53).

During the period when the negative result is obtained in the processing S53 (until the acquisition of the transmission rate information is confirmed), the redundancy determining section 503 repeats the judgment processing from the processing S51 to the processing S53.

On the other hand, in the case where an affirmative result is obtained in the processing S53, the redundancy determining section 503 determines whether or not the retransmission data size is acquired from the ARQ section 209 (S54).

During the period when the negative result is obtained in this processing S54 (until the acquisition of the retransmission data size is confirmed), the redundancy determining section 503 repeats the judgment processing of from the processing S51 to the processing S54.

On the other hand, in the case where an affirmative result is obtained in the processing S54, the redundancy determining section 503 subtracts the retransmission data from the total transmission rate, and obtains the transmission rate in which the data packet block and the FEC redundant packet can be used.

When the transmission rate is obtained, the redundancy determining section 503 refers to the "redundancy table", determines the number of the data packet and the number of the FEC redundant packet so as to satisfy the transmission rate as the restriction condition, and gives these to the coding section 201 and the FEC coding section 295 (S55). These processings are repeatedly executed until the end of the redundancy determination processing is confirmed.

Incidentally, also in the case of this embodiment, the number of the data packets and the number of the FEC redundant packets necessary for data control can be obtained by calculation.

(B-3) Effects of the Embodiments

As described above, when the redundancy determining section 503 is provided in the transmission apparatus 500, and the redundancy of the redundant packet is optimized according to the state of the network, in the limited range of the transmission rate and without unnecessarily increasing the redundancy, the loss rate after error correction at the receiver can be kept within the allowable range.

For example, in the case where the round trip time (RTT) is small, a specified loss rate after error correction can be achieved by the retransmission of the undelivered packet. Thus, the redundancy of the redundant packet is minimized, and the ratio of the data packet block transmitted can be increased.

Besides, in the case where the round trip time (RTT) is large, the requested loss rate after error correction can not be realized by only the retransmission of the undelivered packet, however, the data amount assigned to the data packet block can be maximized within the range where the requested loss rate after error correction can be achieved.

Figure 14:
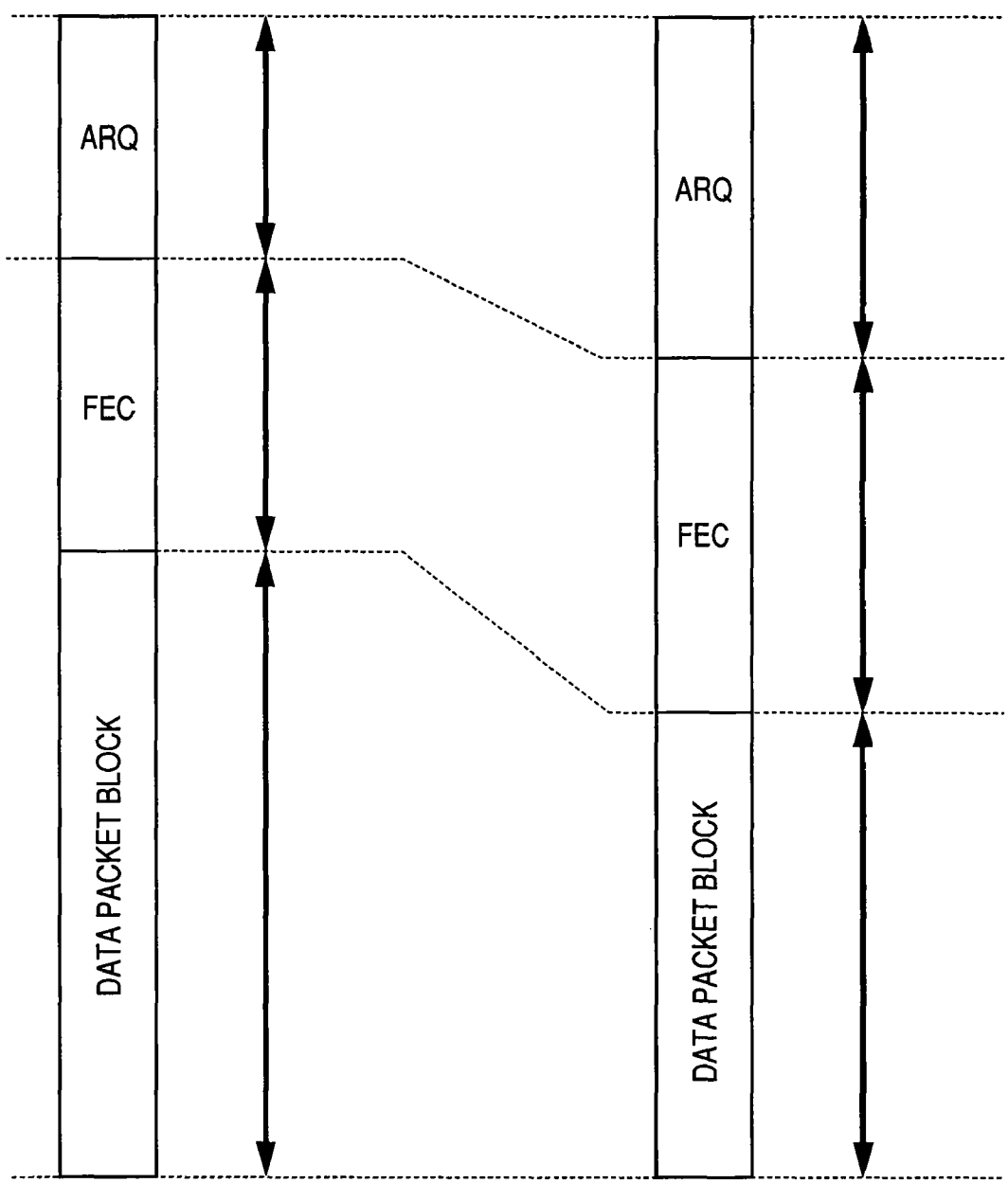
FIG. 14 is a view showing a control image of redundancy executed in embodiment 2.

FIG. 14 shows an image of this processing. As shown in FIG. 14, although the total transmission rate is constant, the ratio of the data packet block to the error correction data (FEC) can be increased/decreased according to the state of the network.

Besides, in this embodiment, by adopting the redundancy determining section 503, it is possible to eliminate the necessity that the user using the transmission/reception apparatus manually changes the setting of the error correction system. As a result, the convenience for the user is enhanced.

Besides, since the data transmission amount necessary for the error correction can be minimized, a large transmission amount can be assigned to the transmission of the data packet block. For example, in the case of the video transmission, as compared with the related art, the higher quality video transmission can be realized.

(C) Other Embodiments (a) The processing functions of the transmission apparatus in the foregoing embodiment can be realized in hardware or software.

Besides, not only all of these processing functions are realized by the hardware or software, but also part thereof may be realized by using the hardware or software. That is, the combination of the hardware and software may be adopted.

b) With respect to the foregoing embodiments, various modified examples are conceivable within the scope of the gist of the invention. Besides, various modified examples and applied examples created or combined based on the recitation of the specification are also conceivable.

It should be understood by those skilled in the art that various modifications, combinations, sub-combinations and alterations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A packet transmission apparatus to transmit a packet having a limited arrival deadline, comprising:
   an automatic packet retransmission section configured to control a retransmission of an undelivered packet;
   a forward error correction coding section configured to add a redundant packet to a data packet block; and
   a redundancy determining section configured to:
   (i) receive network state information; and
   (ii) dynamically determine a redundancy of the redundant packet based on the received network state information to cause a designated loss rate for the retransmission of the undelivered packet after error correction at a receiver.

2. The packet transmission apparatus according to claim 1, wherein the network state information comprises round trip time information.

3. The packet transmission apparatus according to claim 1, wherein the network state information comprises round trip time information and a packet loss rate.

4. The packet transmission apparatus according to claim 1, wherein the redundancy determining section is configured to dynamically determine the redundancy of the redundant packet based on the received network state information and a transmission rate of the data packet block to cause the designated loss rate for the retransmission of the undelivered packet after error correction at the receiver.

5. The packet transmission apparatus according to claim 4, wherein the network state information comprises round trip time information.

6. The packet transmission apparatus according to claim 4, wherein the network state information comprises round trip time information and a packet loss rate.

7. A packet transmission apparatus to transmit a packet having a limited arrival deadline, comprising:
   an automatic packet retransmission section configured to control a retransmission of an undelivered packet;
   a forward error correction coding section configured to add a redundant packet to a data packet block; and
   a redundancy determining section configured to:
   (i) receive network state information;
   (ii) dynamically determine a redundancy of the redundant packet based on the received network state information and an upper limit value of a transmission rate assigned for a transmission of the data packet block and the redundant packet to cause a designated loss rate for the retransmission of the undelivered packet after error correction at a receiver; and
   (iii) dynamically determine a number of packets in the data packet block based on the received network state information and the upper limit value of the transmission rate assigned for the transmission of the data packet block and the redundant packet to cause the designated loss rate for the retransmission of the undelivered packet after the error correction at the receiver.

8. The packet transmission apparatus according to claim 7, wherein the network state information comprises round trip time information.

9. The packet transmission apparatus according to claim 7, wherein the network state information comprises round trip time information and a packet loss rate.

10. A communication system for transmitting or receiving a packet having a limited arrival deadline, the communication system comprising:
    a packet reception apparatus; and
    a packet transmission apparatus in communication with the packet reception apparatus through a network, the packet transmission apparatus including:
    (a) an automatic packet retransmission section configured to control a retransmission of an undelivered packet;
    (b) a forward error correction coding section configured to add a redundant packet to a data packet block; and
    (c) a redundancy determining section configured to:
    (i) receive network state information; and
    (ii) dynamically determine a redundancy of the redundant packet based on the received network state information to cause a designated loss rate for the retransmission of the undelivered packet after error correction at the package reception apparatus.

11. A packet transmission apparatus to transmit a packet having a limited arrival deadline, the packet transmission apparatus comprising:
    a processor; and
    a memory device which stores a plurality of instructions, which when executed by the processor, cause the processor to:
    (i) control a retransmission of an undelivered packet;
    (ii) add a redundant packet to a data packet block;
    (iii), receive network state information; and
    (iv) dynamically determine a redundancy of the redundant packet based on the received network state information to cause a designated loss rate for the retransmission of the undelivered packet after error correction at a receiver.

12. The packet transmission apparatus according to claim 11, wherein the memory device causes the processor to dynamically determine the redundancy of the redundant packet based on the received network state information and a transmission rate of the data packet block to cause the designated loss rate for the retransmission of the undelivered packet after error correction at the receiver.

13. A packet transmission apparatus to transmit a packet having a limited arrival deadline, the packet transmission apparatus comprising:
    a processor; and
    a memory device which stores a plurality of instructions, when executed by the processor, causes the processor to:
    (i) control a retransmission of an undelivered packet;
    (ii) add a redundant packet to a data packet block;
    (iii) receive network state information;
    (iv) dynamically determine a redundancy of the redundant packet based on the received network state information and an upper limit value of a transmission rate assigned for a transmission of the data packet block and the redundant packet to cause a designated loss rate for the retransmission of the undelivered packet after error correction at a receiver; and
    (v) dynamically determine a number of packets in the data packet block based on the received network state information and the upper limit value of the transmission rate assigned for the transmission of the data packet block and the redundant packet to cause the designated loss rate for the retransmission of the undelivered packet after the error correction at the receiver.

* * * * *

UNITED STATES PATENT AND TRADEMARK OFFICE
CERTIFICATE OF CORRECTION

PATENT NO. : 7,958,435 B2
APPLICATION NO. : 11/557834
DATED : June 7, 2011
INVENTOR(S) : Kure et al.

It is certified that error appears in the above-identified patent and that said Letters Patent is hereby corrected as shown below:

On the title page of the patent, item [30] "Foreign Application Priority Data" section, please replace "Sep. 11, 2005 (JP)............................ P2005-324224" with
--Nov. 9, 2005 (JP)............................ P2005-324224--.

Signed and Sealed this
Sixteenth Day of August, 2011

David J. Kappos
*Director of the United States Patent and Trademark Office*